United States Patent
Jiang

(10) Patent No.: US 6,796,223 B2
(45) Date of Patent: Sep. 28, 2004

(54) FOOD DRYING MACHINE

(76) Inventor: Qi Fen Jiang, 75 Springbrook Drive, Richmond Hill, Ontario (CA), L4B 3R3

( * ) Notice: Subject to any disclaimer, the term of this patent is extended or adjusted under 35 U.S.C. 154(b) by 225 days.

(21) Appl. No.: 10/216,759

(22) Filed: Aug. 13, 2002

(65) Prior Publication Data

US 2004/0031398 A1 Feb. 19, 2004

(51) Int. Cl.$^7$ .............................. A23L 1/00; A23L 3/00; A23C 1/00; F26B 3/04
(52) U.S. Cl. ............................ 99/468; 99/476; 99/483; 34/197; 34/196; 34/194; 219/400; 219/401
(58) Field of Search ................... 99/330–331, 352–355, 99/448–450, 467–470, 483, 484, 485; 219/400, 401, 386; 126/219, 369; 34/192–198, 231–233; 312/236

(56) References Cited

U.S. PATENT DOCUMENTS

| | | | | |
|---|---|---|---|---|
| 4,065,857 A | * | 1/1978 | Nelson et al. ................. | 34/493 |
| 4,110,916 A | * | 9/1978 | Bemrose ...................... | 34/197 |
| 4,143,592 A | * | 3/1979 | Kuest et al. .................. | 99/483 |
| 4,152,842 A | * | 5/1979 | Laughlin ...................... | 34/196 |
| 4,531,306 A | * | 7/1985 | Erickson ....................... | 34/546 |
| 4,583,454 A | * | 4/1986 | Huang et al. ................. | 99/468 |
| 4,676,152 A | * | 6/1987 | Tsuji et al. ................... | 99/468 |
| 4,760,779 A | * | 8/1988 | Morris ......................... | 99/475 |
| 4,763,572 A | * | 8/1988 | Kuehl .......................... | 99/476 |
| 5,375,511 A | * | 12/1994 | Huie et al. ................... | 99/483 |
| 5,802,963 A | * | 9/1998 | Cohn et al. .................. | 99/476 |
| 6,054,686 A | * | 4/2000 | Pauly et al. ................ | 219/400 |
| 6,658,995 B1 | * | 12/2003 | DeYoung et al. ............. | 99/468 |

* cited by examiner

Primary Examiner—Timothy F. Simone
(74) Attorney, Agent, or Firm—David W. Wong

(57) ABSTRACT

The machine is operable for continuously extracting moisture or dehydrating food. A plurality of food tray are insertable into a main chamber having an air diffuser mounted on one side and an air collector on the opposite side. Air is drawn through the chamber by a blower. Heat is applied to the food by heater element incorporated at the underside of the food trays. Dampers are located at the air inlet and air exhaust ducts, which may be monitored and adjusted by temperature and moisture sensors for maintaining a selected temperature and moisture condition to extract the moisture content of the food to a desirable condition. The processed food may be retrieved from the machine while a new tray of food is being placed into the chamber.

15 Claims, 6 Drawing Sheets

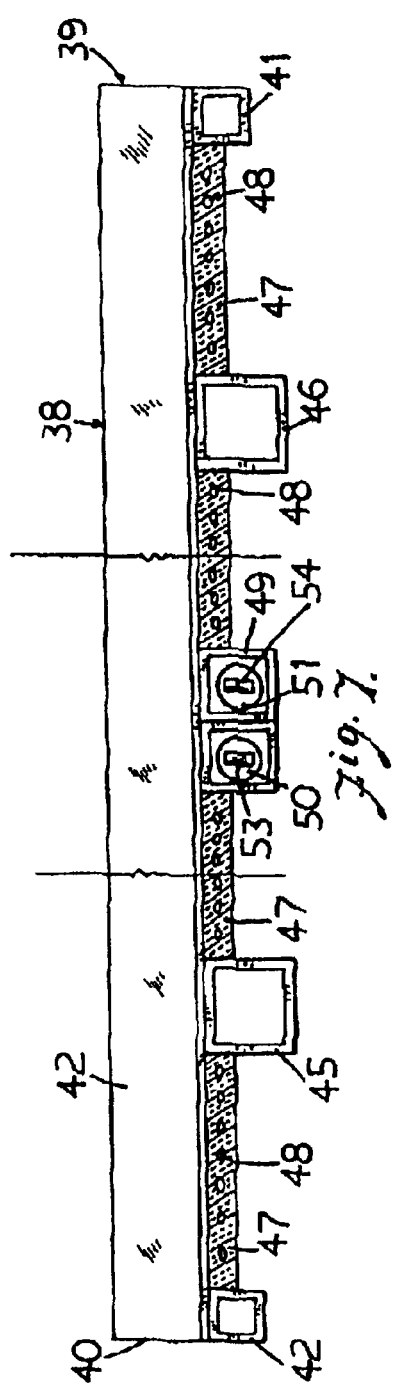
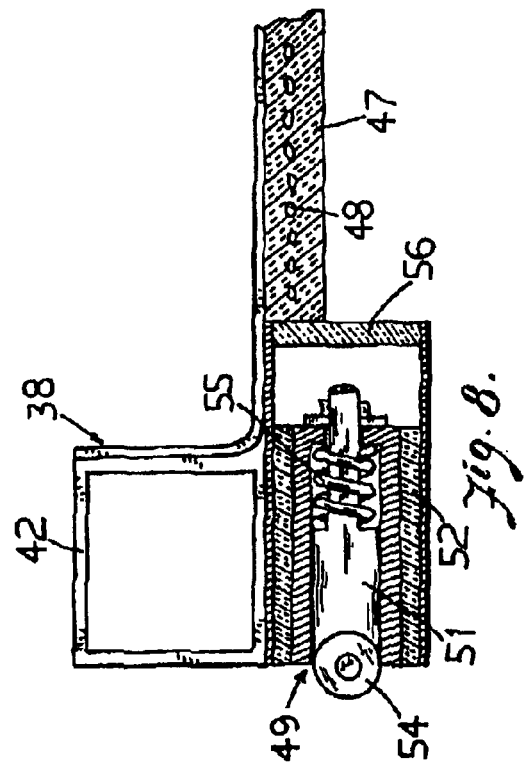
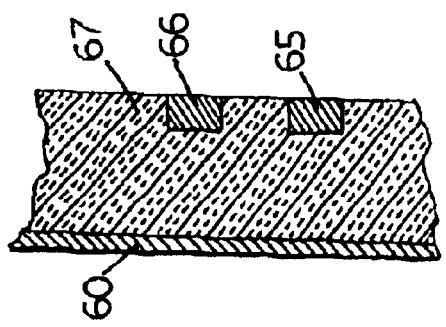

FOOD DRYING MACHINE

FIELD OF THE INVENTION

This invention relates to a food drying device and more particularly to a machine for dehydrating food in a continuous mass production process.

BACKGROUND OF THE INVENTION

In food processing, it is sometimes necessary to dry the food to a selected moisture state. This may be achieved by extracting the moisture fluid content from the food by subjecting it to heat and air. Food may also be dehydrated in the same manner. Dehydration is a desirable method of preserving food products such as vegetable. In dehydration, the fluid content of the food is removed by air drying it under heat such as by drying it naturally under the sun in open air. Such method is time consuming, the condition is not controllable, and the food is subject to contamination.

Food dehydrating devices have been developed for drying food products by artificial means in which the food is subjected to low heat and air stream applied slowly to it over an extended period of time. The main drawback of known dehydrating devices is that only a limited amount of food may be dehydrated over the extended period of time, and the degree of dehydration cannot be controlled or adjusted; thus such devices are not suitable for industrial use in which a large amount of food is to be dehydrated continuously or only selected amount of dehydration is required. Industrial dehydrators such as that described in U.S. Pat. No. 6,367,371 issued to Jian-Ming Ni on Apr. 9, 2002, a large amount of food may be dehydrated in a continuous operation in a large rotatable drum in a fully controllable and monitored condition. However, due to the large size and the complex structure of the rotatable drum of such device, it requires a large factory facility and high cost to fabricate. Furthermore, the dehydration process would be interrupted when the rotatable drum is being cleaned and serviced, resulting in the reduction of efficiency of the dehydration process.

SUMMARY OF THE INVENTION

It is a principal object of the present invention to provide a food drying machine which is operable for extracting a selected amount of moisture content from food.

It is another object of the present invention to provide a food drying machine which is operable for dehydrating a large amount of food in a continuous mass production process.

It is another object of the present invention to provide a machine in which the component parts may be cleaned and serviced without interruption to the food processing operation.

It is another object of the present invention to provide a food drying machine in which the drying process is fully monitored and the operating condition is fully monitored.

It is yet another object of the present invention to provide a food drying machine which is easy to operate.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 7 is an enlarged perspective rear elevation view of the food tray.

FIG. 8 is an enlarged isolated partial sectional side elevation of the rear edge portion of the food tray showing the structure of the electrical contact for the heater element provided integrally beneath the tray.

FIG. 9 is an isolated enlarged horizontal sectional view of the rear wall of the machine showing the construction of the electrical bus bars for conducting the electrical supply to the heater element of the food trays.

DETAILED DESCRIPTION OF THE PREFERRED EMBODIMENTS

Figure 1:
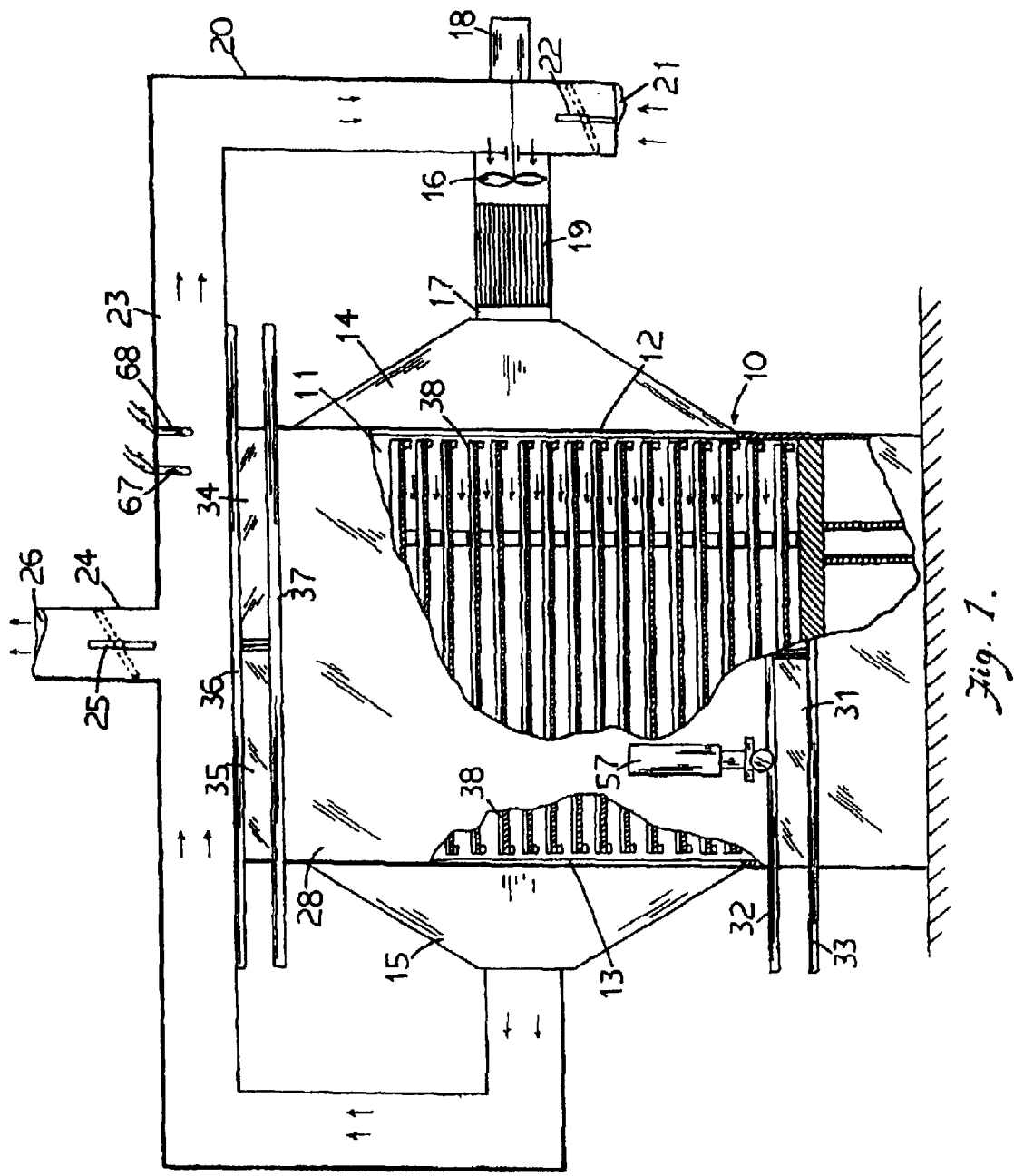
FIG. 1 is a front overall perspective partial schematic elevation view of the food drying machine of the present invention with portions of the front wall removed to show the arrangement of a plurality of food trays in its main chamber.
Figure 2:
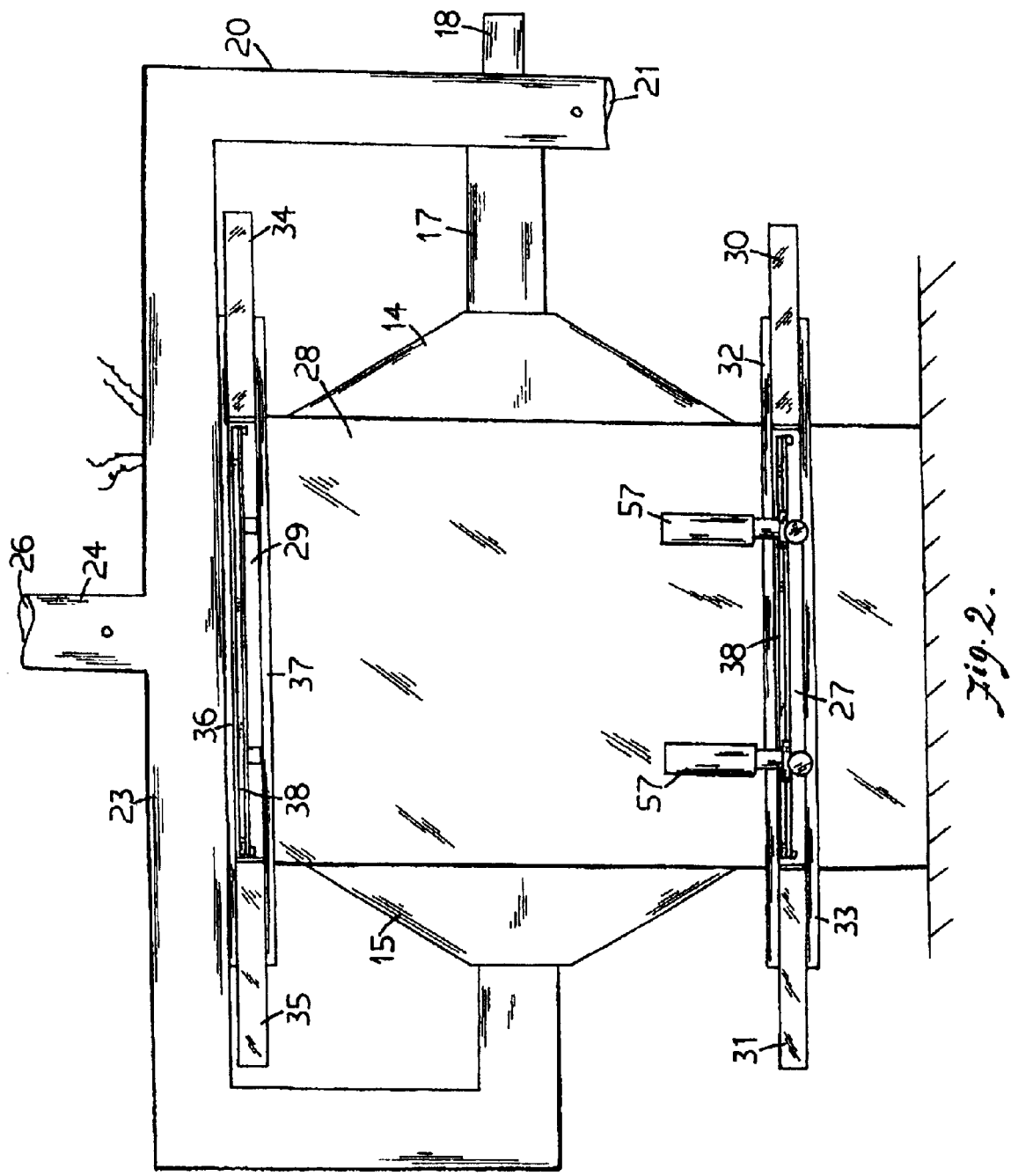
FIG. 2 is a front overall perspective elevation view thereof showing the sliding doors at the tray receiving opening and the tray retrieving opening located in the opened position and the food tray lifters in the lower position engaging with the lower food tray in the main chamber.
Figure 3:
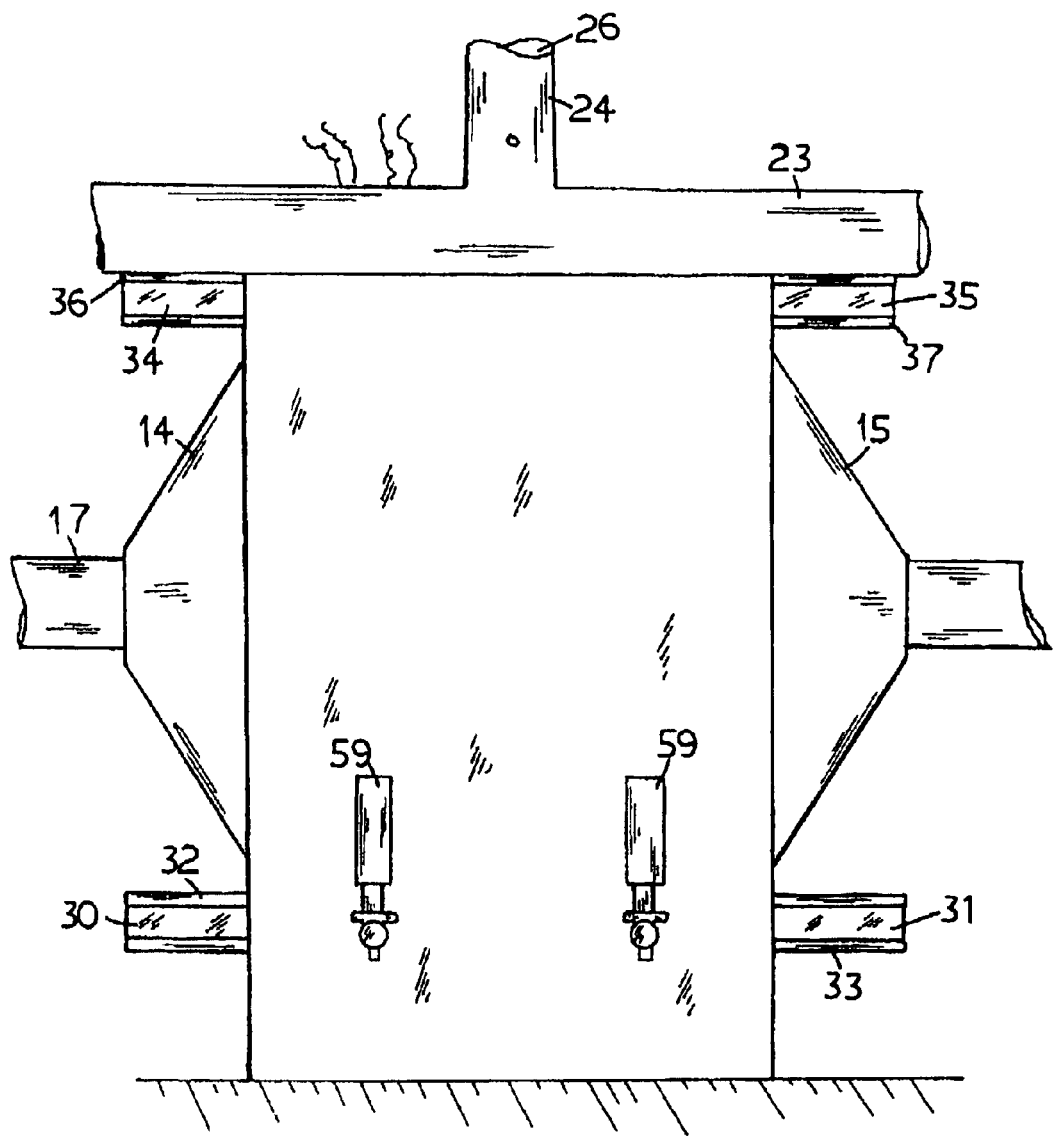
FIG. 3 is a partial overall perspective rear elevation view of the machine.

With reference to the drawings in which like reference numerals designate corresponding parts in the several views, the food drying machine 10 of the present invention has a generally rectangular main chamber 11 having a metal frame. A large air inlet opening 12 is formed in one of the side walls and a similar large air outlet opening 13 is formed in the opposite side wall. The air inlet opening 12 and the air outlet opening 13 extend over almost the entirety of both sides of the main chamber 11 respectively. A first funnel shaped air diffuser 14 is mounted at the first side wall and covering over the air inlet opening 12 in a divergent manner towards the main chamber 11. A similar funnel shaped air collector 15 is mounted on the opposite side wall of the main chamber 11 and covering over the outlet opening 12 therein in a convergent manner outward from said main chamber 11. Air is blown into the air diffuser 14 by an air blower 16 through a transition duct 17. The blower 16 is operated by a variable speed electric motor 18. A plurality of heater tubes 19 are located in the transition duct 17, which may be operated to heat the air as it is driven by the air blower 16 to flow into the main chamber 11. The rate of the air flow may be adjusted by varying the rotational speed of the electric motor 18. A main air duct 20 is connected to the transition duct 17. Outside air is drawn into the main chamber 11 through the main air duct 20 from its fresh air inlet port 21 by operating the blower 16. An inlet air damper 22 is provided adjacent to the fresh air inlet port 21 such that it may be operated to locate in various chosen skewed positions for selecting the amount of air flowing into the main air duct 20 or to close the latter completely so as to stop the outside fresh air from being drawn into the main chamber 11.

The main air duct 20 is connected to the air collector 15 by a return duct 23. An exhaust duct 24 is connected to the return duct 23 such that the air after passing through the main chamber 11 may be released from the machine 10. An air outlet damper 25 is provided in the exhaust duct 24, which may be adjusted to select the amount of air to be released or to close the exhaust duct 24 completely so as to stop any air from being released from the machine from an air exhaust port 26 of the exhaust duct 24. Moreover, both the inlet air damper 22 and the air outlet damper 25 may be closed to re-circulate a selected amount of the humid exhaust air from the exhaust air collector 15 to the air diffuser 14 for re-circulating through said main chamber 11.

A tray receiving opening 27 is located adjacent the lower end of the front wall 28 of the main chamber 11. The tray receiving opening 27 extends the entire horizontal width of the front wall 28. Similarly, a tray retrieving opening 29 is located adjacent the upper end of the front wall 28 and it also extends the entire horizontal width of the front wall 28. Two sliding doors 30 and 31 are provided at the tray receiving opening 27. The sliding doors 30 and 31 are slidably mounted on two parallel horizontal rails 32 and 33. Similarly, two sliding doors 34 and 35 are provided at the tray retrieving opening 29, and the two sliding doors 34 and 35 are slidably mounted on two parallel horizontal rails 36 and 37. The sliding doors 30, 31, 34 and 35 may be opened or closed by controllable electric or pneumatic means.

Figure 4:
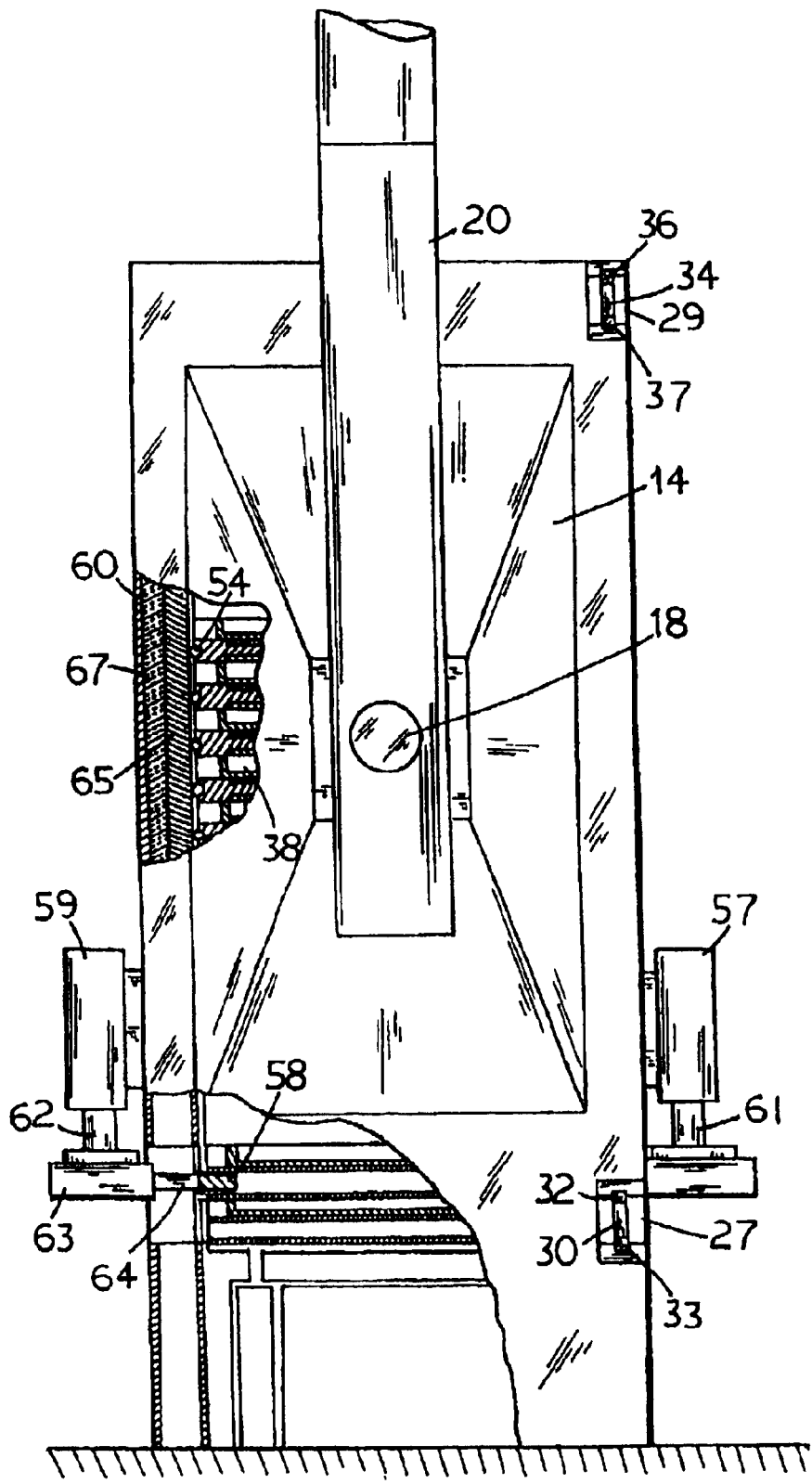
FIG. 4 is an overall perspective side elevation view thereof with portions of the side wall removed to show the side wall, support frame and food tray electrical contact arrangements therein.
Figure 5:
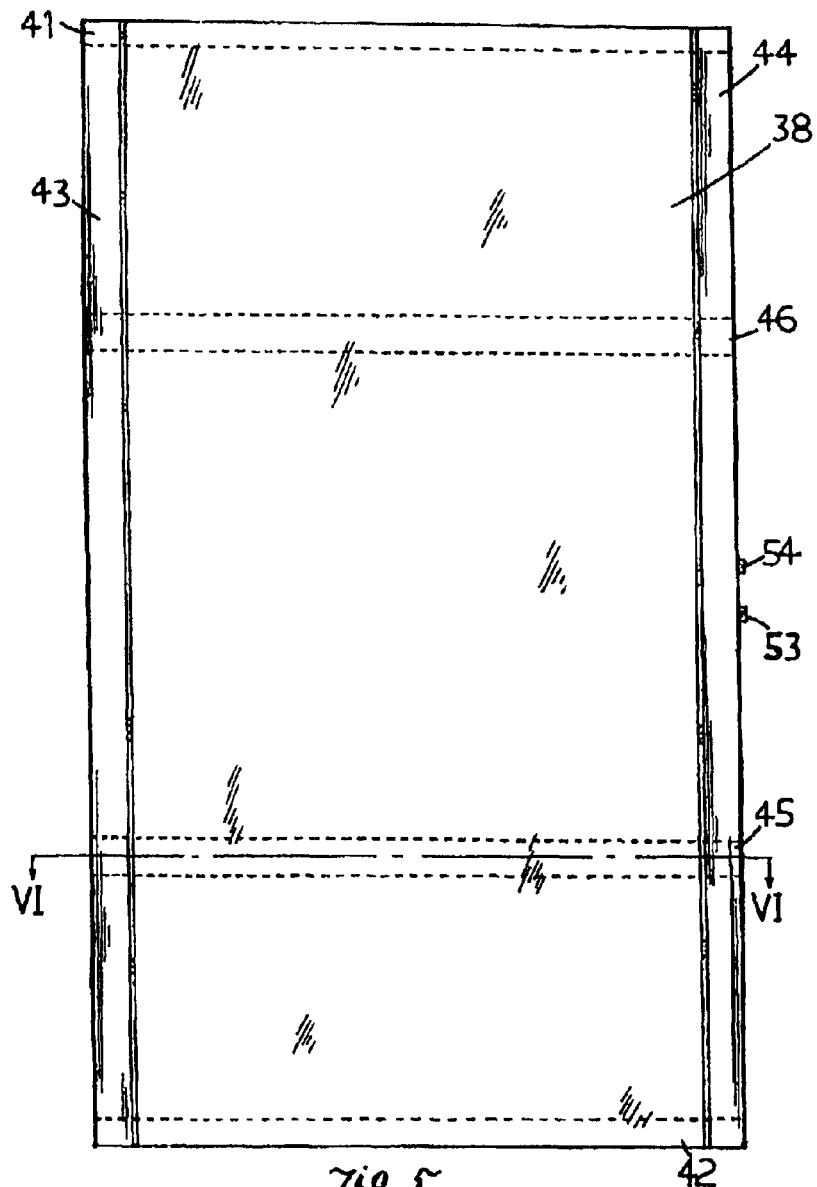
FIG. 5 is a top elevation view of the food tray of the drying machine.
Figure 6:
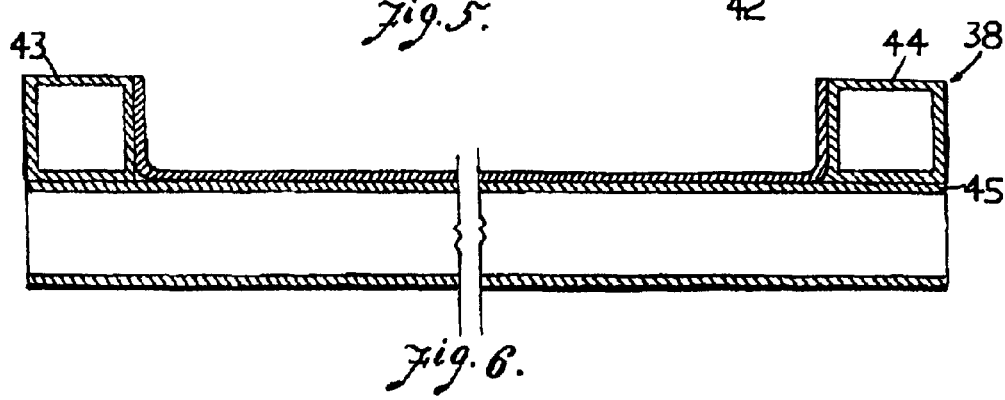
FIG. 6 is an enlarged cross sectional side view of the food tray along the section line VI—VI in FIG. 5.

A plurality of food trays 38 are slidably insertable into the main chamber 11, one at a time, through the tray receiving opening 27. Each food tray 38, as best shown in FIGS. 4 and 5, has dimensions substantially equal to the horizontal interior cross sectional dimensions of the main chamber 11 and it is preferably made of stainless steel for ease of maintenance. The tray has two opened sides 39 and 40 without any side walls. Two elongated rectangular tubular reinforcing bars 41 and 42 are provided along the underside of the side edge portions therein and extending over the entire length of the two side edges of the tray. Similarly, two additional elongated rectangular tubular reinforcing bars 43 and 44 are provided along the front and rear top edge portions of the tray juxtaposed to the front and rear wall of the tray. The rectangular tubular reinforcing bars 43 and 44 extend over the entire width of the front and rear edges respectively of the tray. Two parallel relatively large elongated rectangular tubular supporting bars 45 and 46 are provided at the underside of the tray and located an equal short distance inwards from the side edges of therein. The tubular supporting bars 45 and 46 are opened at both their ends. Therefore, the tray 38 may be lifted and carried by the fork arm of a fork-lift truck with the fork arm inserted into the opened ends of the supporting bars 45 and 46. A sheet heater element 47 having a heating element 48 located evenly within it, is mounted at the underside of the tray or formed integrally therein. The electrical supply to the heater element 47 is provided by an electrical contact assembly 49 consisting of two plungers 50 and 51 slidably mounted within an electrically insulated housing 52. Rotatable circular metal contact rotary wheels 53 and 54 are mounted respectively at the front end of the plungers 50 and 51 which are biassed by a compression spring 55 so that the contact rotary wheels 53 and 54 would normally extend outwards beyond the front edge of the tray 38. At this normal position, the rear end of the plungers 50 and 51 are spaced from electrical contacts located in the plunger housing 52 which has an insulated end cover 56. The contacts are electrically connected to the heater element. When the contact rotary wheels 53 and 54 are depressed against the spring force of the biassing spring 55, their rear ends will engage the electrical contacts in the plunger housing 52 so that electrical power may be applied to the heater element 47 to energize the latter through the depressed contact rotary wheels 53 and 54.

A plurality of food trays 38 may be placed into the main chamber 11 by first opening the sliding doors 30 and 31. Once a tray 38 has been fully inserted into the main chamber 11, two pairs of tray lifters, with one pair of front lifters 57 mounted at the front wall 28 of the main chamber 11, and the other pair of rear lifters 59 mounted at the rear panel 60 of the main chamber 11. The front lifters 57 and rear lifters 59 are operable to position between a first position horizontally spaced from the main chamber 11 and a second position juxtaposed to the main chamber 11. The front lifters 57 have a vertical slidable rod 61 and the rear lifters 59 have a similar vertical slidable rod 62 having a horizontal arm assembly 63 mounted at their lower ends. The horizontal arm assembly 63 has a horizontal cantilever arm 64 mounted on its side facing the main chamber 11. The front end portion 58 of the horizontal arm 64 is replaceable and is made of a durable metal to reduce wear in use. The slidable rod 61 and 62 of the lifters 57 and 59 respectively are also operable vertically to extend the horizontal arm assembly 63 between an upper position and a lower position. The distance between these upper and lower positions is equal to the height of one food tray. Slots are provided on the front wall 28 and rear wall 60 to allow the horizontal arm 64 of the lifters to slide between these upper and lower positions.

A food tray 38 is inserted into the main chamber 11 by first positioning the lifters 57 and 59 at the upper position and spaced from the main chamber 11. The sliding doors 30 and 31 of the tray receiving opening are then opened so that a first food tray 38 may be inserted into the main chamber 11. After the first food tray 38 has been fully inserted into the main chamber 11, the front lifters 57 and the rear lifters 59 are operated to move to the lower position and then inwards towards the main chamber 11 until the horizontal cantilever arms 64 of the two pairs lifters 57 and 59 have been inserted into the front and rear opened ends of the rectangular supporting bars 45 and 46 at the underside of the food tray 38. The lifters 57 and 59 are then operated to raise their vertical slidable rods 61 and 62 simultaneously so that the first food tray 38 is carried by the horizontal cantilever arms 64 of the lifters 57 and 59 to the upper position. A second food tray 38 may then inserted into the main chamber 11 while the first food tray is being held at the upper position by the lifters 57 and 59. After the second food tray 38 has been inserted, the lifters 57 and 59 may then be operated to move outwards from the main chamber 11 so that their horizontal arms 64 disengage from the rectangular supporting bars 45 and 46 of the first food tray 38 so that the first food tray would now be supported by the second food tray now located at the lower position. The lifters 57 and 59 may then be operated as above to lift the second food tray to the upper position with the first food tray rising one more food tray height higher in the main chamber 11. A plurality of food tray may thus be inserted into the main chamber 11, one by one, in turn in the above manner until the main chamber 11 is full.

Two spaced parallel electrical bus bars 65 and 66 are mounted vertically on an insulation panel 67 over the inside surface of the rear wall 60. The electrical bus bars 65 and 66 will engage with the contact rotary wheels 53 and 54 and will depress the plungers 50 and 51 when the food trays are located completely within the main chamber 11. Electrical power may then be supplied to the heater element 47 of the food trays 38 through the electrical bus bars 65 and 66 contacting with the.

A temperature sensor 67 and a humidity sensor 68 are mounted in the return duct 23 for sensing the temperature and humidity of the exhaust air returned from the collector 15.

In operation, food trays 38 fill with the food such as fresh vegetable to be processed is carried by a fork lift truck and inserted into the main chamber 11 in the above described manner with the temperature and humidity set at a selected degree. The energization of the heater elements 48, the speed of the blower 16, the opening of damper 22 at the fresh air inlet port 21 and the damper 25 at the air exhaust, are fully monitored and controlled by the temperature sensor 67 and humidity sensor 68 to maintain the temperature and humidity in the main chamber 11. The air 69 is drawn by the blower 16 to pass through the main chamber 11 from the diffuser 14 to the collector 15 while the food in all the food trays 38 is heated by the heater elements 47 of the trays and fresh air and/or re-circulated exhaust air between the exhaust air collector 15 and air diffuser 14. Thus, moisture content of the food is extracted by the air passing through the food through the food trays from the two opened sides. The divergent funnel shape of the diffuser 14 ensures that the air 69 is distributed evenly over all food trays 38 within the main chamber 11. The convergent funnel shape of the collector 15 ensures that the exhaust air is drawn evenly from the main chamber 11. The exhaust air is re-circulated back into the main chamber 11 through the return duct 23 by controlling the damper 25 at the exhaust duct 24 as well as the damper 22 at the air inlet duct 20. For dehydration of vegetable, the temperature and humidity of the main chamber 11 are typically maintained at 70 to 150 degree centigrade and the humidity is maintained such that only humid air of over 90% humidity is exhausted from the machine. The less humid air is re-circulated into the main chamber such that it is again utilized to extract the fluid content of the food so as to increase the efficiency of utilizing the circulated air. The air flow is maintained at a rate such that it would not blow the food off the food tray, typically the air flow rate may be in the range of 0.1 to 0.7 meter per second.

Since the moisture content of the food in the food tray would be extracted as soon as the tray is inserted into the main chamber 11, the degree of dryness of the food in the trays as they are being inserted into the main chamber 11 would be the highest for that in the tray first reaches the top of the main chamber, and the moisture content will be the least extracted from that in the last tray inserted into the main chamber. Thus the size of the main chamber 11 and the number of trays to be contained in the main chamber may be designed such that when the last tray is being inserted into the main chamber, the food in the tray first inserted into the main chamber and now first to reach the top of the main chamber would already have been processed to the desired dryness condition. Thus, the first food tray may be retrieved from the main chamber 11 through the retrieving opening 29 with the fork lift truck with the food therein already dried to the desired condition before the last food tray is inserted into the main chamber. The processed food is then delivered to a final station for packaging for merchandising. The tray is then re-filled with fresh food for insertion into the main chamber. In this manner, the food in the trays are continuously being inserted into and retrieved from the machine to mass produce processed food of a desired dryness condition. Additional trays may be provided such that when any tray requires cleaning or servicing a replacement tray may be conveniently used without interruption to the processing operation of the food.

Whereas particular designs of the apparatus of the present invention have been described above for purposes of illustration, it will be evident to those skilled in the art that various modifications and alternative constructions can be made without departing from the full scope of the invention, as defined in the appended claims.

What I claim is:

1. A food drying machine comprising,
   a generally rectangular main chamber having two opposite side walls, a front wall and a rear wall,
   a first large opening formed in one of said side walls, and a second large opening formed in the opposite side wall,
   a first funnel shaped incoming air diffuser member mounted on said one of said side walls and covering over said first large opening,
   a second funnel shaped exhaust air collector member mounted on said opposite side wall and covering over said second large opening,
   a transition duct coupled to said incoming air diffuser member,
   an air inlet duct connected to said transition duct,
   a variable speed air blower located in said transition duct and adapted for drawing air from an inlet port to flow through said main chamber,
   a return air duct coupled to exhaust air collector member and to said air inlet duct and being operative to conduct a selected portion of exhaust air from said main chamber back to said air diffuser member, said return air duct having an exhaust duct provided with an air exhaust port adapted to release selected portion of exhaust air from said main chamber,
   a first door opening formed at a bottom portion of said front wall of said main chamber and extending horizontally over the width of said front wall, and adapted for receiving a plurality of food trays inserted, one at a time, into said main chamber,
   a second door opening formed at a top portion of said front wall of said main chamber and extending horizontally over the width of said front wall, and adapted for retrieving said food tray, one at time, from said main chamber.

2. A food drying machine according to claim 1 including a first damper member located in said incoming air duct and being operative for controlling amount of air passing through said inlet air port into said main chamber, a second damper member located in said air exhaust duct and being operative for controlling amount of exhaust air releasing through said air exhaust port.

3. A food drying machine according to claim 2 including a temperature sensor and a humidity sensor located in said return air duct, adapted for controlling said first damper member and second damper member for admitting a selected amount of fresh air and return air to flow through said main chamber and a selected temperature condition within said main chamber.

4. A food drying machine according to claim 3 including a plurality of heat tubes located in said transition duct and adapted for heating said incoming air and return exhaust air passing therethrough.

5. A food drying machine according to claim 4 wherein each food tray has a front wall and a back wall, and opened sides, two elongated rectangular tubular supporting bar members having opened front end and back end and disposed underneath said tray in a mutually parallel manner and spaced respectively a short distance from both side edges of said tray, said supporting bar members extending over the entire length from front to back of said tray.

6. A food drying machine according to claim 5 including a sheet heater element mounted underneath each food tray, an electrical contact assembly mounted at a rear edge of said food tray and being operative for conducting electrical power to said sheet heater element.

7. A food drying machine according to claim 6 wherein said electrical contact assembly includes two slidable plunger members slidably mounted in a housing located at an edge portion of said rear edge of said food tray, each plunger member having a rotary wheel rotatably mounted on a front end therein, said plunger members being normally biassed by a spring member whereby said rotary wheel on said plunger members extend outwards beyond said rear edge of said food tray, an electrically conductive contacts connected to said heater element electrically and located in said housing and positioned spaced from a rear end of said plunger members and adapted to contact with said rear end of plunger members when said plunger members are depressed to retract within said housing.

8. A food drying machine according to claim 7 including two parallel elongated metal bus bars disposed on the inside surface of said rear wall of said main chamber, and adapted to contact said rotary wheel and to depress said plunger members of said food trays and operative to conduct electrical power to said food tray when said food trays are fully inserted into said main chamber.

9. A food drying machine comprising,
a generally rectangular main chamber having two opposite side walls, a front wall and a rear wall,
a large air inlet opening formed in one side wall and having a size extending over substantially the entirety of one side wall of said opposite side walls,
a large air exhaust opening formed in the other side wall of said opposite side walls and having a size extending over substantially the entirety of said other side wall,
a funnel shaped incoming air diffuser member mounted on said one side wall and covering over said air inlet opening in a divergent manner towards said main chamber,
a funnel shaped exhaust air collector member mounted on said other side wall and covering over said air exhaust opening in a convergent manner outward from said main chamber,
a transition duct coupled to said incoming air diffuser member,
an air inlet duct coupled to said transition duct,
a variable speed air blower located in said transition duct and adapted for drawing air from an air inlet port located at said air inlet duct to flow through said transition duct into said main chamber,
a return air duct coupled to said air exhaust air collector member and to said air inlet duct, and adapted to conduct a selected portion of exhaust air from said main chamber back to said air diffuser member, said return air duct having an exhaust duct coupled thereto, said exhaust duct having an air exhaust port adapted to release selected portion of exhaust air out of said main chamber,
a first horizontal door opening formed adjacent to a bottom edge of said front wall of said main chamber and extending horizontally over substantially the entire width of said front wall, and adapted for receiving a food tray to be inserted therethrough into said main chamber,
a second horizontal door opening formed adjacent to a top edge of said front wall of said main chamber and extending horizontally over substantially the entire width of said front wall, and adapted for a food tray to be retrieved from said main chamber,
a first damper member located in said incoming air duct and being operative for controlling the amount of air admitted through said air inlet port to flow into said main chamber,
a second damper member located in said air exhaust duct and being operative for controlling the amount of air exhausting from said main chamber through said exhaust port,
a plurality of heat tubes located in said transition duct and being operative for heating air flowing through said transition duct into said main chamber,
a temperature sensor and a humidity sensor located in said return duct and being operative for controlling said first damper member and second damper member to select a drying condition to be obtain in the food in food trays located in said main chamber.

10. A food drying machine according to claim 9 including a plurality of food tray insertable into said main chamber, one at a time, each food tray of said plurality of food tray is rectangular in shape and has a front wall, a back wall, and opened sides, said food tray filled with food is insertable into said main chamber through said first horizontal door opening, with said opened sides juxtaposed to said first opening and second opening respectively, two parallel elongated rectangular tubular supporting bar members mounted at an undersurface of said tray and located a short distance from said sides and extending from a front edge to a rear edge of said tray and having opened front and back ends.

11. A food drying machine according to claim 10 including a first elongated rectangular reinforcing bar member mounted along the underside edge portion of one of said sides, a second elongated rectangular reinforcing bar member mounted along the underside edge portion of the other one of said sides, a third elongated rectangular reinforcing bar member mounted along said front wall of said tray, and a fourth elongated rectangular reinforcing bar member mounted along said back wall of said tray.

12. A food drying machine according to claim 11 including a first pair of lifter members mounted on said front wall of said main chamber and being operative to move between a first vertical position to a second vertical position, and having a cantilever arm member therein operative for engaging with opened front ends of said supporting bar members of a selected one of said food trays inserted into said main chamber through said first door opening, a second pair of lifter members mounted on said rear wall of said main chamber and being operative to move between said first vertical position to said second vertical position, and having a cantilever arm member therein extending into said main chamber and operative for engaging with opened rear ends of said supporting bar members of said selected one of said food trays, whereby said first pair of lifter members and said second pair of lifter members are operative simultaneously to lift said selected one of said food trays located in said main chamber from said first vertical position to said second vertical position, said first vertical position and second vertical position being spaced from one another equal to one food tray height.

13. A food drying machine according to claim 12 including a sheet heater element mounted at the underside of said food trays, each food tray having an electrical contact assembly mounted at a rear edge therein and being operative for conducting electrical power to said sheet heater element, said electrical contact assembly including two slidable plunger members slidably mounted in a housing located at a rear edge portion of said food tray, each plunger member having a rotary wheel rotatably mounted on a front end therein, said plunger members being normally biassed by a spring located in said housing whereby said rotary wheel on said plunger members extend outwards beyond said rear edge of said food tray, two electrically conductive contacts located in said housing and positioned normally spaced from a rear end of said plunger members and adapted to contact with said rear end of plunger members when said plunger members are depressed to retract within said housing, two parallel elongated metal bus bars disposed on the inside surface of said rear wall of said main chamber, and adapted to contact said rotary wheel for depressing said plunger members when said food tray is fully inserted into said main chamber whereby electrical power is supplied to said sheet heater element of said food tray through said metal bus bars.

14. A food drying machine according to claim 13 including a first pair of horizontally slidable doors mounted at said first horizontal door opening of said main chamber, and a second pair of slidable doors mounted at said second horizontal door opening of said main chamber.

15. A food drying machine according to claim 14 wherein a plurality of food trays containing food therein are insertable into said main chamber, one at a time, through said one door opening, said main chamber has a height equal to a total height of a selected number of food trays whereby a food tray is raised to said second door opening, said food therein is dried to a selected condition.

* * * * *